(12) United States Patent
Sandepudi et al.

(10) Patent No.: US 12,079,815 B2
(45) Date of Patent: Sep. 3, 2024

(54) GRAPHICAL USER INTERFACE FOR EDITING CLASSIFICATION RULES

(71) Applicant: PayPal, Inc., San Jose, CA (US)

(72) Inventors: Ravi Shanker Sandepudi, Hyderabad (IN); Ayez Ahmad, Hyderabad (IN)

(73) Assignee: PayPal, Inc., San Jose, CA (US)

( * ) Notice: Subject to any disclaimer, the term of this patent is extended or adjusted under 35 U.S.C. 154(b) by 109 days.

(21) Appl. No.: 17/710,981

(22) Filed: Mar. 31, 2022

(65) Prior Publication Data

US 2022/0222675 A1 Jul. 14, 2022

Related U.S. Application Data

(63) Continuation of application No. 16/389,142, filed on Apr. 19, 2019, now abandoned.

(51) Int. Cl.
*G06Q 20/00* (2012.01)
*G06N 5/025* (2023.01)
*G06N 20/00* (2019.01)
*G06Q 20/40* (2012.01)

(52) U.S. Cl.
CPC ......... *G06Q 20/4016* (2013.01); *G06N 5/025* (2013.01); *G06N 20/00* (2019.01)

(58) Field of Classification Search
CPC .... G06Q 20/40; G06Q 20/4016; G06N 20/00; G06N 5/02; G06N 5/025
USPC .................................................. 705/4, 35–45
See application file for complete search history.

(56) References Cited

U.S. PATENT DOCUMENTS

| | | | |
|---|---|---|---|
| 2007/0022027 A1 | 1/2007 | Gupta et al. | |
| 2009/0210368 A1* | 8/2009 | Deo | G06N 5/046 706/20 |
| 2010/0305993 A1 | 12/2010 | Fisher | |
| 2012/0130853 A1* | 5/2012 | Petri | G06Q 30/0609 705/26.35 |
| 2013/0054438 A1 | 2/2013 | Boding | |
| 2013/0138563 A1 | 5/2013 | Gilder et al. | |
| 2015/0379426 A1 | 12/2015 | Steele et al. | |
| 2015/0379429 A1* | 12/2015 | Lee | G06N 20/00 706/11 |
| 2016/0071017 A1 | 3/2016 | Adjaoute | |

(Continued)

OTHER PUBLICATIONS

Amarasekara B.R., et al., "Controlling Risks and Fraud in Affiliate Marketing: A Simulation and Testing Environment," 14th Annual Conference on Privacy, Security and Trust (PST), Auckland, (doi: 10.11.09/PST.2016.7906986), 2016, pp. 353-360.

(Continued)

*Primary Examiner* — Eric T Wong
*Assistant Examiner* — Mohammed H Mustafa

(57) ABSTRACT

Techniques are disclosed relating to a graphical user interface (GUI) for editing classification rules. The graphical user interface may include a display of a modified threshold value for a classification rule, where values on one side (e.g. above) the threshold value indicate a first type of classification, and values on the other side (e.g. below) indicate a second type of classification. Machine learning techniques may be used to suggest a modified threshold value to the user, who may accept the modified value, or may provide, via the GUI, their own modified value, which can be different from a suggested value. Graphical indications of accuracy for the classification rule may be displayed.

20 Claims, 9 Drawing Sheets

(56) References Cited

U.S. PATENT DOCUMENTS

| | | | | |
|---|---|---|---|---|
| 2016/0104163 | A1* | 4/2016 | Aquino | G06Q 20/4016 |
| | | | | 705/44 |
| 2018/0108016 | A1 | 4/2018 | Jin et al. | |
| 2018/0285773 | A1* | 10/2018 | Hsiao | G06Q 30/04 |
| 2018/0293292 | A1* | 10/2018 | Odibat | G06N 20/00 |
| 2018/0350006 | A1* | 12/2018 | Agrawal | G06Q 10/067 |
| 2019/0333069 | A1 | 10/2019 | Noble et al. | |
| 2020/0005310 | A1 | 1/2020 | Kumar et al. | |
| 2020/0053127 | A1* | 2/2020 | Brotherton | H04L 67/53 |
| 2020/0210914 | A1 | 7/2020 | Makhija et al. | |
| 2020/0242610 | A1 | 7/2020 | Liu et al. | |

OTHER PUBLICATIONS

Hulstaert L., "Black-Box vs. White-Box Models," Retrieved on Oct. 17, 2021, Retrieved from Internet URL: https://towardsdatascience.com/machine-learning-interpretability-techniques-662c723454f3, Mar. 14, 2019, 6 pages.

Mantovani R G., et al., "Hyper-parameter Tuning of a Decision Tree Induction Algorithm," 2016 5th Brazilian Conference on Intelligent Systems, pp. 37-42.

Ravi S., "A Primer on Machine Learning Models for Fraud Detection", Jun. 28, 2017; https://simility.com/blog/machine-learning/primer-machine-learning-models-fraud-detection-2/, Retrieved Mar. 14, 2019, 4 pages.

Ravi S., "Making Data a Competitive Advantage in the Fight Against Evolving Cyber Threats", https://simility_com/blog/making-data-a-competitive-advantage/, Retrieved Mar. 14, 2019, 3 Pages.

Samant K., "White Paper: Machine Learning: The Secret Ingredient for Detecting and Preventing Fraud", Simility, 2017, 8 pages.

Wikipedia., "Data Science," Retrieved from Internet URL: https://en.wikipedia.org/w/index.php?title=Data_science&oldid=1050021872, last edited on Oct. 15, 2021, 6 pages.

Wikipedia., "Security Engineering," Retrieved from Internet URL: https://en.wikipedia.org/w/index.php?title=Security_engineering&oldid=1017168910, last edited on Apr. 11, 2021, 5 pages.

* cited by examiner

520

| Performance Metrics Information | | ✕ |
|---|---|---|
| | Before applying suggestions | After applying suggestions |
| precision | 0.046 | 0.093 |
| recall | 0.026 | 0.033 |
| f1 | 0.033 | 0.049 |
| f2 | 0.028 | 0.038 |
| f.5 | 0.040 | 0.068 |

FIG. 5C 530                                                                                           532

💡 New threshold suggestions available. By applying these, you can potentially increase the rule's precision by +102.080% and recall by +28.336%   ↻ Revert

| AND | OR |  514       ✏ Add JavaEL  + Add condition  ⊕ Add group
| Cpf Cnpj.Num Distinct Phones Per Cpf Cnpj ▼ | greater ▼ | value ▼ | 5 | ⊘ | ✕ Delete |

513                                   FIG. 5D                                  518

GRAPHICAL USER INTERFACE FOR EDITING CLASSIFICATION RULES

CROSS REFERENCE TO RELATED APPLICATION

This application is a continuation of U.S. patent application Ser. No. 16/389,142, filed Apr. 19, 2019, which is incorporated herein by reference in its entirety.

BACKGROUND

Technical Field

This disclosure relates generally to computer system security, and more particularly to tuning fraud-detection rules using machine learning.

Description of the Related Art

Server computer systems, such as web servers, application servers, email servers, etc., provide various computing resources and services to an end user. For example, a web service may use a computer system to provide access to software applications to remote users via a network. As the ubiquity of web services increases, so too does the amount of data being created and transmitted between the services and end users. While this increase in user data can be a valuable resource for service providers, it can also be used by malicious third-parties to attempt fraudulent activity against the web service and its user accounts.

In some instances, a service provider may attempt to limit such fraudulent activity by relying on "hand-written" fraud-detection rules to identify patterns of behavior commonly associated with fraud. These hand-written fraud-detection rules suffer from various shortcomings, however. For example, such rules may be time- and resource-intensive to maintain, resulting in significant administrative overhead. Further, in various instances, these hand-written fraud-detection rules may become less effective as malicious users adapt their behavior to circumvent such fraud-detection rules.

BRIEF DESCRIPTION OF THE DRAWINGS

FIGS. 5A-5D are example user interfaces that may be used to receive and accept a suggested update to a fraud-detection rule, according to some embodiments.

DETAILED DESCRIPTION

Figure 1:
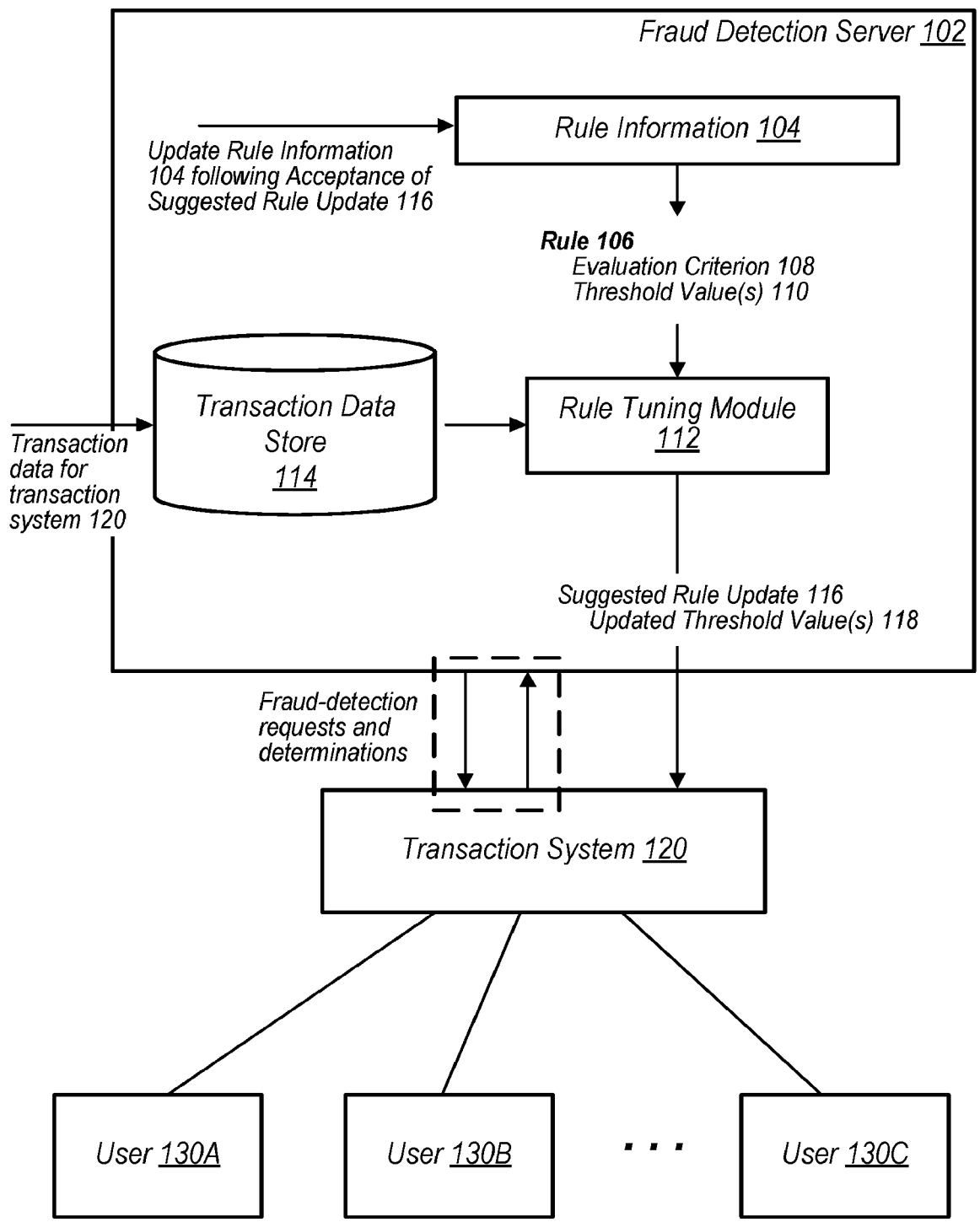
FIG. 1 is a block diagram illustrating an example system for tuning fraud-detection rules using machine learning, according to some embodiments.

With the proliferation of web services, there has been a dramatic increase in the amount of data being created and handled every day. This data can be a valuable resource for service providers by offering insights into user activity and preferences. However, this readily available user data can also present certain challenges to service providers. For example, malicious users may access, share, and exploit user data, enabling them to launch specialized and targeted attacks against the service provider and its users, such as account takeover attacks, fraudulent transactions, etc. Note that such service providers are also referred to herein as "transaction systems," as they may provide a web service through which end users may perform various "transactions," which, as used herein, is meant to refer to any interaction between a transaction system and an end user. For instance, as one non-limiting example, a transaction system may provide a web service that enables users to perform financial transactions (e.g., a service associated with a bank or online payment system) such as transferring money, accessing financial information, etc. In such instances, a malicious user may collect data associated with an authorized user and perform an account takeover attack, enabling the malicious user to perform various financial transactions to the same extent as the authorized user. Note, however, that in various instances, a transaction system may provide a web service that is not financial in nature. For example, in some embodiments, a transaction system may provide an email service, a streaming media service, host a website, etc. Further note that the term "transaction" does not necessarily refer to an interaction between the transaction system and end user that is financial in nature. In embodiments in which the transaction system provides a financial web service, the "transactions" performed by the transaction system may be financial transactions. In other embodiments, however, in which the transaction system provides a web service that is not financial in nature (e.g., an email service), the term "transaction" may refer to non-financial interactions between the transaction system and an end user.

Various techniques have been used to attempt to mitigate fraudulent transactions. In many instances, for example, machine learning algorithms may be used to help identify and prevent fraudulent activities attempted by malicious users, as machine learning models can be used to analyze large datasets and detect specific trends that would often be overlooked by human analysts. Additionally, outcome data (e.g., whether a pattern of user activity actually was malicious) can be fed back into the system, allowing these machine learning models to continually adapt.

Many service providers are hesitant, however, to rely on machine learning models to detect and prevent such malicious activity, seeing machine learning models as a "black box" that is sometimes opaque and difficult to interpret. For example, some such machine learning models may simply identify a requested transaction as potentially fraudulent without offering a coherent rationale for the fraud determination. Some service providers prefer greater control and instead opt to use more traditional "hand-written" rules to detect specific user behaviors that are believed to be malicious. For example, to evaluate a requested transaction, a service provider may define a hand-written fraud-detection rule that provides as follows: if there has been more than 10 transactions performed from the requesting IP address within a given time period and the transaction amount exceeds $100, flag the requested transaction as fraudulent. After the requested transaction has been flagged, the service provider may then take one or more corrective actions, such as requiring the requesting user to perform an additional layer of authentication, denying the transaction, performing a manual review, etc.

While such hand-written rules may be easy for a human to understand, this approach does present various shortcomings. For instance, to detect different use-patterns associated with fraudulent activity, a service provider may need to define a large number (e.g., 20, 30, etc.) of fraud-detection rules. To circumvent such fraud-detection rules, however, malicious users are continually adapting the way in which they attempt fraudulent activity, which may cause the efficacy of the hand-written fraud-detection rules to degrade over time. With an increasing number of fraud-detection rules, the service provider can end up with a significant amount of overhead in tuning these rules so they remain up-to-date and effective. Thus, reliance on hand-written fraud-detection rules alone often results in a system that is both time- and resource-intensive while being ineffective in detecting and mitigating fraudulent activity on an ongoing basis.

In various embodiments, the disclosed systems and methods may address these or other technical problems by tuning fraud-detection rules using machine learning. For example, in various embodiments, a transaction system may establish a first fraud-detection rule that specifies one or more evaluation criteria (e.g., number of transactions performed from a single IP address) and one or more corresponding threshold values (e.g., 10 transactions attempted from the single IP address). This and other fraud-detection rules may then be used by a fraud detection service to evaluate attempted transactions with the transaction system. In various embodiments, the fraud-detection service may perform (e.g., periodically, in response to declining performance, etc.) tuning operations to tune the first fraud-detection rule in an effort to improve its efficacy. For example, the fraud-detection service may retrieve metadata associated with the first fraud-detection rule, and apply a machine learning algorithm to transaction data associated with the service provider to determine an updated threshold value for one or more of the rule's evaluation criteria. The fraud-detection service may evaluate the performance of the first fraud-detection rule using the updated threshold value and, based on that performance, send a suggested update to the service provider for the first rule. If the service provider chooses to accept this suggested update, the fraud-detection service may then update the rule definition for the first rule to reflect the changes suggested by the machine learning model.

Continuing with the example above, for instance, application of the machine learning algorithm may indicate that, for the evaluation criteria of "number of transactions performed from a single IP address," a threshold value of "5" is a more effective predictor of fraudulent activity than the previously defined threshold value of "10." The fraud-detection service may then evaluate the performance of the first fraud-detection rule using this updated threshold value and, if the efficacy of the rule improves, the fraud-detection service may send a message to the service provider suggesting a corresponding update to the first fraud-detection rule. Note that this embodiment is provided merely as an example and is not intended to limit the scope of the present disclosure. For example, in other embodiments, the service provider may provide any other suitable web service. Further, in various embodiments, a fraud-detection rule may have any suitable number of evaluation criteria and any suitable number of corresponding threshold values. For instance, in some embodiments, a given evaluation criterion may have a single threshold value (as in the example above) or may have two or more threshold values used to evaluate the evaluation criterion.

Thus, in various embodiments, the disclosed systems and methods use machine learning to tune fraud-detection rules, allowing the transaction system to maintain control and understanding of how fraud detection is performed while improving the fraud-detection service's ability to identify and prevent fraudulent activity. This, in turn, may reduce the instances of fraudulent activity associated with the transaction system and improve data security for the transaction system as a whole.

Referring now to FIG. 1, a block diagram illustrating a system 100 for tuning fraud-detection rules using machine learning is shown, according to some embodiments. In the embodiment of FIG. 1, system 100 includes fraud detection server 102, transaction system 120, and various users 130. Note that, although shown in direct communication, one or more of fraud detection server 102, transaction system 120, and users 130 may be connected via one or more communication networks (not shown for clarity).

In various embodiments, transaction system 120 provides a web service accessible to various remote users 130 via one or more communication networks. For example, in various embodiments, transaction system 120 may host an email service, streaming service, an online retail store, an online payment service, or any other suitable web service. For example, in the following discussion of FIG. 1, reference will be made to embodiments in which the transaction system 120 is an online merchant that offers various products or services to remote users 130. Note, however, that this embodiment is provided merely as an example and is not intended to limit the scope of the present disclosure. In other embodiments, the disclosed systems and methods may be implemented in the context of any other suitable web service.

In various embodiments, transaction system 120 may delegate the process of detecting fraudulent activities (e.g., attempted by one or more of the users 130) to fraud-detection server 102. In the depicted embodiment, fraud detection server 102 is a server system that is operable to perform fraud-detection services for various transaction systems, such as transaction system 120. Fraud detection server 102, in various embodiments, is configured to analyze transaction requests received by the transaction system 120 and provide a fraud risk determination back to the transaction system 120, which transaction system 120 may then use to make a final decision for the transaction (e.g., whether to authorize the transaction or take some other corrective action). For example, as shown in FIG. 1, fraud detection server 102 includes (or has access to) transaction data store 114, which may include various types of data associated with transaction system 120 and the service it provides. As a non-limiting example, this transaction data may include: user identifiers, session identifiers, event types, transaction times, origin IP addresses, or any other suitable transaction data that may be used to detect fraudulent activity. The fraud detection server 102 may use this data to train one or more machine learning models that may be used to detect fraudulent activity associated with the transaction system 120. As will be appreciated by one of skill in the art with the benefit of this disclosure, "training" a machine learning model refers generally to the process of providing a machine learning algorithm with a training dataset from which the algorithm may learn patterns that map input variables associated with an observation (e.g., origin IP address) to a particular output (e.g., a classification as either fraudulent or not fraudulent, in the present example). When the transaction system 120 then receives a transaction request, it may send a fraud-detection request (including details of the current transaction) to the fraud detection server 102. Fraud detection server 102 may then analyze the current transaction (e.g., using one or more fraud-detection rules specified by the transaction system 120) and provide a fraud determination back to transaction system 120.

As noted above, fraud-detection rules may need to be updated from time-to-time to maintain their effectiveness in detecting fraudulent activity. In various embodiments, fraud detection server 102 is configured to tune one or more fraud-detection rules associated with transaction system 120. For example, as shown in FIG. 1, fraud detection server 102 includes (or has access to) rule information 104, which specifies one or more fraud-detection rules for transaction system 120. Fraud detection server 102 may select a rule 106 to attempt to update. Rule 106 may be selected by the fraud detection server 102 for update based on various factors, such as the amount of time that has elapsed since rule 106 was last updated, the performance of rule 106 falling below a certain threshold, the performance of the rule 106 declining, etc. As shown in FIG. 1, rule 106 includes an evaluation criterion 108 and one or more corresponding threshold values 110.

Figure 2:
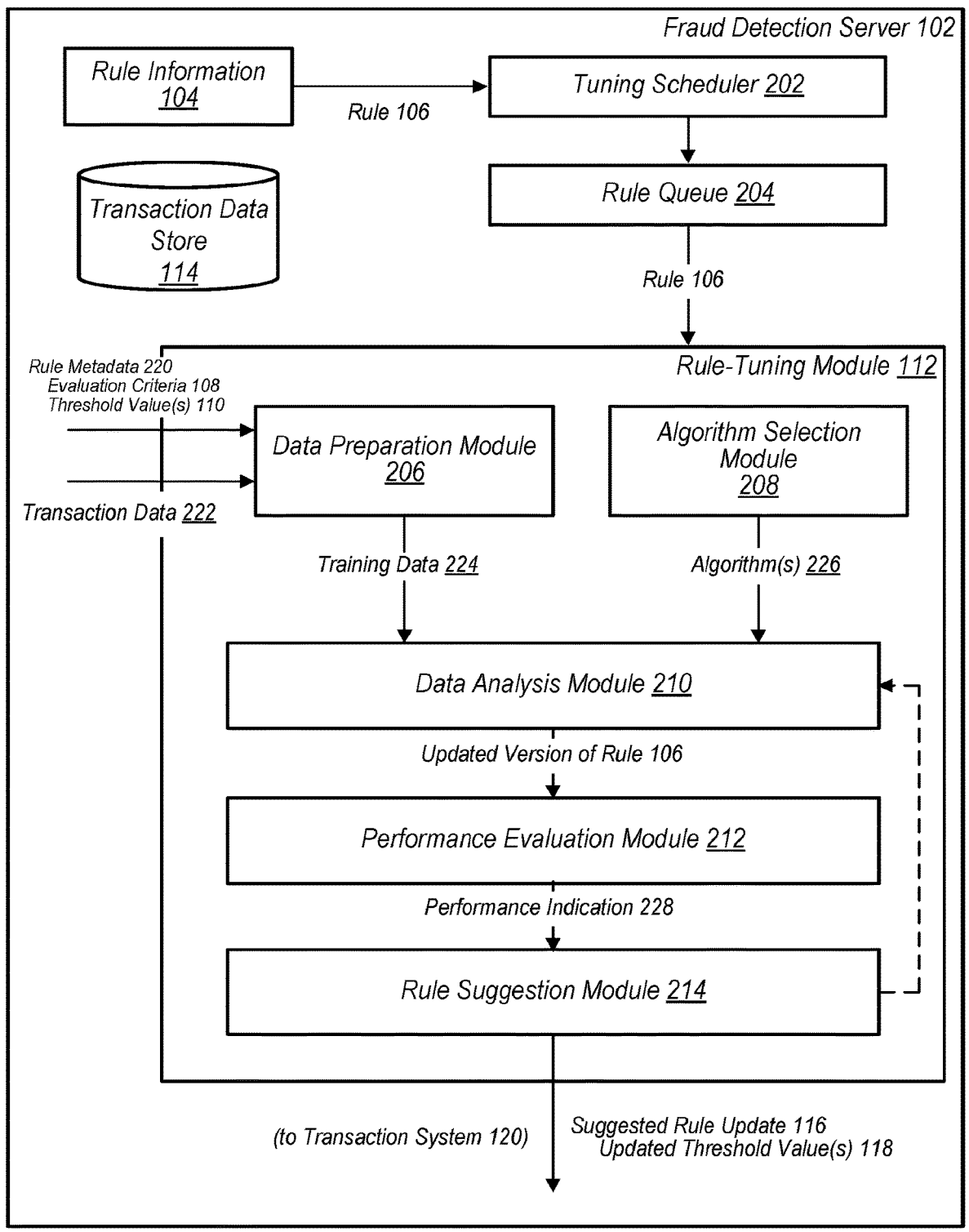
FIG. 2 is a block diagram illustrating subcomponents of an example fraud-detection server system, according to some embodiments.

Fraud detection server 102 further includes rule-tuning module 112, which, as described in more detail below with reference to FIG. 2, is operable to perform tuning operations to update the fraud-detection rule 106. For example, in various embodiments, rule-tuning module 112 retrieves metadata associated with the rule 106, applies one or more machine learning algorithms to transaction data 114 associated with the transaction system 120 to determine one or more updated threshold values 118 for the evaluation criteria, and evaluates the performance of the rule 106 using the updated threshold values 118. The rule-tuning module 112 may then determine whether to suggest an update to the rule 106 to the transaction system 120. For example, if the performance of the rule 106 using the updated threshold value(s) 118 exceeds its performance with the previous threshold value(s) 110 (e.g., by a certain threshold based on one or more performance metrics), fraud detection server 102 may send a suggested rule update 116 to the transaction system 120. In the depicted embodiment, the suggested rule update 116 specifies the updated threshold value(s) 118 as the aspect of rule 106 that has been tuned. In other embodiments, however, the suggested rule update 116 may specify one or more additional evaluation criteria to be added to the rule 106 (instead of or in addition to the updated threshold value(s) 118) to improve its fraud-detection efficacy.

Once the suggested rule update 116 is received, a user (e.g., an administrator) associated with the transaction system 120 may determine whether to accept the suggested rule update 116. In some embodiments, as described in more detail below with reference to FIGS. 6A and 6B, the fraud detection server 102 may allow the user at transaction system 120 to test the suggested rule update 116 prior to accepting the suggested rule update 116. For example, the fraud detection server 102 may provide an interface that graphically depicts the actual performance of the rule 106 using the previous threshold value(s) 110 and the hypothetical performance of the suggested rule update 116 over a given period of time (e.g., the last 30 days, 60 days, etc.). If the user associated with the transaction system 120 accepts the suggested rule update 116, the fraud detection server 102 may then update the rule information 104 for the rule 106 to reflect the suggested changes to the rule 106. For example, in the depicted embodiment, fraud detection server 102 would update the rule information 104 for the rule 106 to associate the one or more updated threshold value(s) 118 with the evaluation criterion 108 such that, when the rule 106 is utilized by the fraud detection server 102 in the future, it applies the rule 106 using the updated threshold value(s) 118.

Turning now to FIG. 2, a block diagram of an example fraud detection server 102 is shown, according to some embodiments. In various embodiments, fraud detection server 102 is configured to perform tuning operations to tune one or more fraud-detection rules used to implement a fraud-detection service for transaction system 120.

Fraud detection server 102 includes tuning scheduler 202, which, in various embodiments, is a software process (e.g., a daemon) operable to determine when to submit a fraud-detection rule for tuning operations. In the depicted embodiment, tuning scheduler 202 selects rule 106, from rule information 104, as a rule for which to perform rule-tuning operations. Tuning scheduler 202 may make this determination based on various factors, including, for example, whether rule 106 has recently been tuned, whether the transaction system 120 has accepted previous suggested updates for rule 106 or other fraud-detection rules associated with system 120, whether the performance of rule 106 has recently declined, etc. Note, however, that these embodiments are provided merely as non-limiting examples and, in other embodiments, any other suitable criteria may be used by the tuning scheduler 202 to select a given fraud-detection rule for tuning operations. Further note that, in some embodiments, tuning scheduler 202 may select a rule 106 for tuning in response to a user request from transaction system 120. For example, a user (e.g., an administrator) associated with the transaction system 120 may initiate tuning operations for one or more fraud-detection rules 106 by sending a request to the fraud detection server 102, according to some embodiments.

In various embodiments, once tuning scheduler 202 selects a rule to update, the selected rule is sent to rule queue 204. In various embodiments, rule queue 204 is storage included in (or accessible to) fraud detection server 102 that is used to store rules to be updated until such time that they can be accepted and analyzed by the rule-tuning module 112. In various embodiments, rule queue 204 may operate in a first-in-first-out ("FIFO") manner in which the first rule placed in the queue by the tuning scheduler 202 is the first rule selected by rule-tuning module 112 for analysis. In other embodiments, however, rule queue 204 may operate as a priority queue in which rules are placed in the rule queue 204 with an associated priority value. In such embodiments, rules may then be selected for tuning based on a level of importance as indicated by the priority value. In other embodiments, rule queue 204 may use any other suitable queueing technique (e.g., last-in-first-out, etc.).

FIG. 2 includes rule-tuning module 112, which, in turn, includes data preparation module 206. In various embodiments, once a rule is selected (e.g., from rule queue 204) for tuning by the rule-tuning module 112, data preparation module 206 is operable to fetch various data for use in tuning the rule. For example, in the depicted embodiment, data preparation module 206 fetches rule metadata 220 associated with the rule 106 being tuned. Rule metadata 220 may include various items of information associated with the rule 106 being analyzed, such as the one or more evaluation criteria 108 used by the rule, the manner in which the one or more evaluation criteria 108 are applied by the rule (e.g., the logical operators and structure used by the rule), and any corresponding threshold value(s) 110 for the evaluation criteria 108.

Data preparation module 206 may also retrieve transaction data 222, for example from transaction data 114, which may include transaction data associated with the transaction system 120 over a given time period. For example, transaction data 222 may include historical transaction data for all transactions performed by transaction system 120 during a given time period (e.g., the last 30 days), including various details about each of the transactions performed during that time period (e.g., IP of origin, transaction amount, time of day, etc.). Further, in various embodiments, transaction data 222 may also include any final fraud determinations for each of the transactions that were performed during this time period (30 days, in the current example). The data for these final fraud determinations may include, for example, any fraud evaluations provided by the fraud detection server 102, whether the transaction system 120 accepted or rejected those fraud evaluations, whether the transactions were fraudulent or not, whether the fraud evaluations were correct, etc. In various embodiments, data preparation module 206 is operable to generate training data 224 using the rule metadata 220 and transaction data 222 and make that training data 224 accessible to data analysis module 210.

Rule-tuning module 112 further includes algorithm selection module 208, which, in various embodiments, is operable to select one or more algorithms 226 to apply to tune a given fraud-detection rule. Algorithm selection module 208 may select from a plurality of different data-analysis algorithms, each of which may be differently suited for tuning a fraud-detection rule based, for example, on the rule itself, the nature of the transaction system 120 or the transaction data 222, etc. In various embodiments, algorithm selection module 208 may select one or more algorithms 226 to use to analyze the training data 224. In some embodiments, algorithm selection module 208 may have a default algorithm that will be applied unless certain factors are present that motivate the use of a different algorithm. Further, in some embodiments, algorithm selection module 208 may select one or more algorithms 226 to apply in stages. For example, in some embodiments, module 208 may first select a simple, quickly implemented algorithm (such as the percentile rank or standard deviation algorithms) to apply to the training data 224. These simple algorithms may be used as a feasibility check to determine whether the particular rule 106 is a good candidate for further tuning operations. (Note that, in some embodiments, this step of first applying a simple algorithm as a feasibility check may instead be performed by tuning scheduler 202 when determining whether to schedule a rule 106 for tuning operations.) In such embodiments, if the initially selected algorithm indicates that the rule 106 is a suitable candidate for further tuning operations, algorithm selection module 208 may then select a more rigorous data analysis algorithm to apply. In one non-limiting example, algorithm selection module 208 may select a decision tree as the algorithm 226 to be used to analyze the training data 224. Note, however, that this example is provided merely as an example and, in other embodiments, any suitable machine learning algorithm may be used.

Data analysis module 210, in various embodiments, is operable to apply the selected algorithm 226 to the training data 224 and determine one or more updates to the rule 106. For example, in various embodiments, data analysis module 210 may determine one or more updated threshold values 118 for a given evaluation criterion 108. In other embodiments, data analysis module may determine one or more additional evaluation criteria to be added to the rule 106 (instead of or in addition to the updated threshold value(s) 118) to improve its efficacy. As one non-limiting example, algorithm 226 may, in some embodiments, be a decision tree algorithm, and data analysis module 210 may train a decision tree based on the training data 224. For example, as described in more detail below with reference to FIG. 3, through the training process, the decision tree may establish "nodes" that correspond to the evaluation criteria 108 in a given fraud-detection rule 106, with threshold values for the evaluation criteria 108 that are optimized during the training process. In some embodiments, data analysis module 210 may determine one or more updated threshold values 118 for the evaluation criterion 108 by traversing the trained decision tree to identify threshold values that deviate from the existing evaluation criteria 108 for the rule 106. Based on the performance increase offered by these alternative threshold values, rule-tuning module 112 may determine whether to suggest an updated version of rule 106 to the transaction system 120. Further, note that, in some embodiments, data analysis module 210 may apply multiple, different algorithms to generate the updated version of the rule 106.

Rule-tuning module 112 further includes performance evaluation module 212, which, in various embodiments, is operable to compare the performance of the existing rule 106 and the updated version of the rule 106. For example, as noted above, data analysis module 210 may determine one or more updated threshold values 118 for an evaluation criterion 108 of rule 106, in various embodiments. In such embodiments, performance evaluation module 212 may compare the performance of the rule 106 using the previous threshold values 110 against the performance of the rule 106 using the updated threshold values 118. Performance evaluation module 212 may base its evaluation on any of various data analysis metrics (such as precision, recall, an f1 score, an f2 score, an f0.5 score, etc.) for measuring the change in performance of the previous and updated version of rule 106. As will be appreciated by one of skill in the art with the benefit of this disclosure, an "f-score" (e.g., an f1 score, f2 score, f0.5 score, etc.) is a performance metric used to measure of a test's accuracy based on its precision and recall. In some embodiments, this performance evaluation may be performed using a "hold-out" data set that includes transaction data that was not used as part of the training data 224. Based on this comparison, performance evaluation module 212 may generate a performance indication 228 specifying the outcome of this comparison. Note that, in various embodiments, performance indication 228 may be expressed as a Boolean value, numeric value, or in any other suitable format that specifies the outcome of the performance evaluation.

Rule-tuning module 112 further includes rule suggestion module 214, which, in various embodiments, is operable to determine whether to send a suggested rule update 116 to the transaction system 120 based on the performance indication 228. For example, if the performance indication 228 specifies that the performance of the updated version of rule 106 exceeds a certain level, it may send the suggested rule update 116 to the transaction system 120. As will be appreciated by one of skill in the art with the benefit of this disclosure, the degree of performance increase used to determine whether to send the suggested rule update 116 may vary in different embodiments. In some embodiments, for example, the suggested rule update 116 may be sent to the transaction system 120 if there is any increase in performance whatsoever relative to the existing version of rule 106 (e.g., a 1% increase in performance). In other embodiments, however, rule suggestion module 214 may send the suggested rule update 116 only if there is a certain degree of improvement in one or more of the performance metrics (e.g., a 10% increase in precision using the updated version of rule 106).

If, however, the performance indication 228 specifies that the performance of the updated version of rule 106 does not exceed the performance of the existing rule 106 (or if the degree of performance increase is not sufficient to justify sending the suggested rule update 116 to the transaction system 120), then the rule suggestion module 214 may not send the suggested update 116. In some such embodiments, rule-tuning module 112 may simply cease rule-tuning operations for rule 106 until a later time. In other embodiments, however, the process of generating a suggested rule update 116 may be iterative as indicated in FIG. 2, and the operations performed by modules 210, 212, and 214 may be repeated multiple times until a suitable suggested rule update 116 is ultimately determined.

Figure 3:
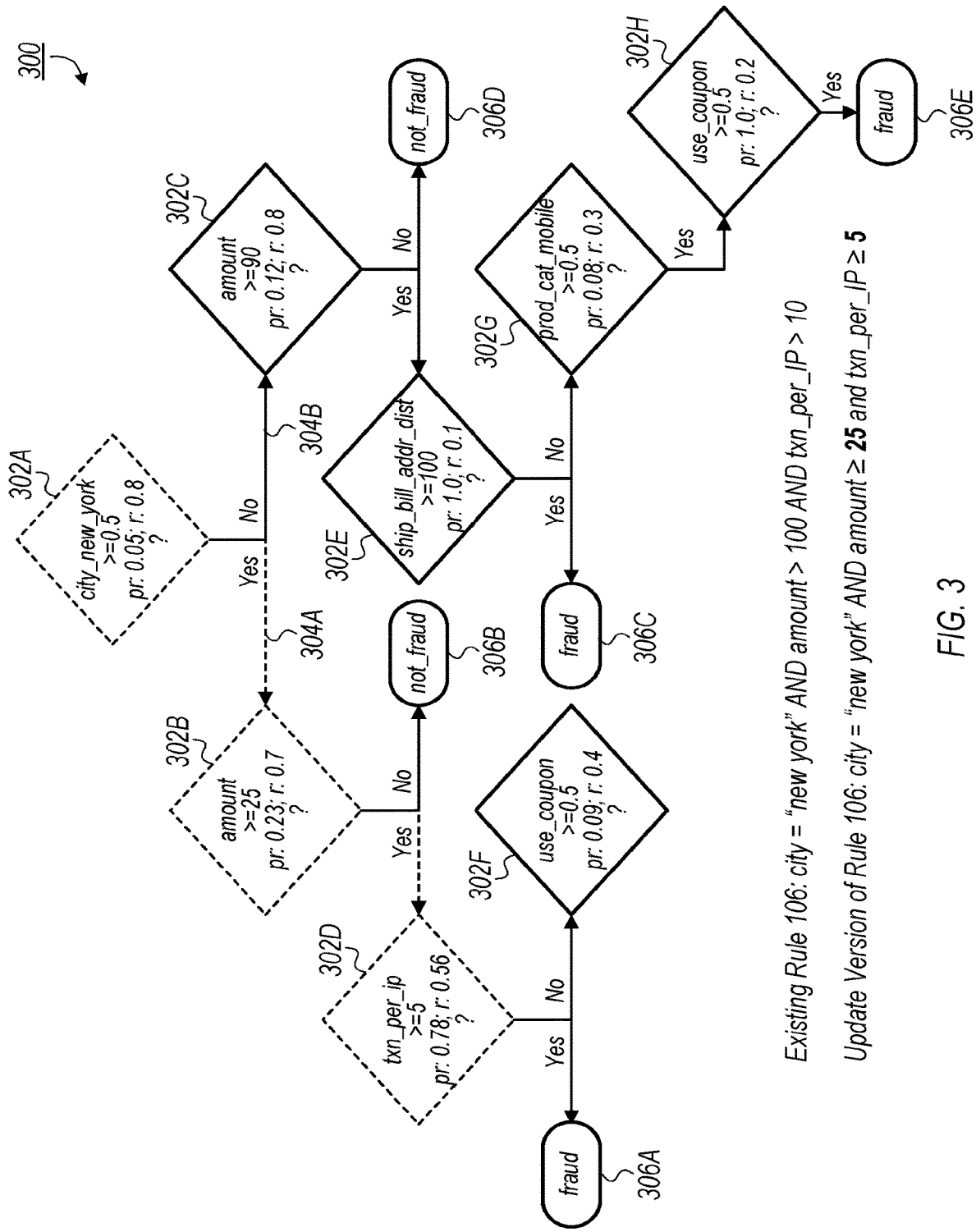
FIG. 3 is a portion of a decision tree for an example fraud-detection rule, according to some embodiments.

FIG. 3 depicts a portion of a decision tree 300 for an example fraud-detection rule 106, according to some embodiments. In various embodiments, decision tree 300 may be constructed by rule-tuning module 112 of FIG. 2 based on training data 224. More specifically, data analysis module 210 may import the training dataset 224 and train the decision tree 300 using any of various suitable decision tree algorithms, such as ID3, C4.5, CART, etc. Once trained, decision tree 300 may be used to tune threshold values for fraud-detection rules.

As shown in FIG. 3, decision tree 300 includes various nodes 302, each of which corresponds to an evaluation of a feature. The portion of decision tree 300 shown in FIG. 3, for example, includes eight nodes 302A-302H. From each of the nodes 302 are branches 304 representing the outcomes for the evaluation performed at the node 302. In various embodiments, decision tree 300 may be traversed in a flowchart-like manner from the top (e.g., node 302A, in the depicted embodiment) down to a terminal leaf node 306, which, in various embodiments, are class labels that correspond to a classification for a transaction as either "fraudulent" or "not fraudulent." For example, in the depicted embodiment, node 302A asks whether an incoming transaction request originated in New York City. If that condition is true, the tree 300 would follow branch 304A to subsequent node 302B. If, however, that condition is false, the tree 300 would follow branch 304B to node 302C.

As noted above, many transaction system administrators prefer to use traditional, hand-written fraud-detection rules to detect fraudulent activity associated with their systems. One reason for this preference is that such rules include strings of conditional statements (constructed, for example, using evaluation criteria and corresponding threshold values) that are easy to understand. In various embodiments, a decision tree may be particularly useful for tuning a hand-written fraud-detection rule as the evaluation criteria used to construct the rule may logically map to nodes of the decision tree. Take, for example, the fraud-detection rule 106 shown in FIG. 3, which includes three evaluation criteria: the location of origin for a transaction request, the dollar amount involved in the transaction, and the number of transactions that have been performed using the requesting IP address. In this embodiment, the evaluation criteria for fraud-detection rule 106 may be represented as part of the nodes 302 of decision tree 300, as indicted by the dashed lines used for nodes 302A, 302B, and 302D. Specifically, node 302A represents the "location of origin of the transaction request" evaluation criteria, node 302B represents the "transaction amount" evaluation criteria, and node 302D represents the "number of transactions per IP address" evaluation criteria. (Note that, in the depicted embodiment, the evaluation criteria of rule 106 are all joined by logical AND operators. In other embodiments, however, any suitable combination of logical operators may be used to join evaluation criteria in the construction of a fraud-detection rule.) Further, in various embodiments, nodes 302 may include one or more threshold values that may be used to test the evaluation criteria at the given node 302. For example, node 302B, in the depicted embodiment, asks whether the transaction amount for a given transaction is greater than 25 (e.g., U.S. dollars). In this example, the value "25" is the threshold value for the evaluation criteria at node 302B.

In various embodiments, data analysis module 210 may train decision tree 300 based on the training data 224 and then, using the trained decision tree 300, generate an updated version of a fraud-detection rule 106. For example, in the depicted embodiment, decision tree 300 is used to generate an updated version of fraud-detection rule 106. Based on the fraud-detection rule 106, data analysis module 210 may traverse the decision tree 300 to follow the nodes that correspond to the evaluation criteria in the rule 106. As it traverses the tree 300, data analysis module 210 may identify nodes 302 for which the threshold values of the decision tree 300 differ from the existing threshold values for the rule 106. For example, in the depicted embodiment, the existing rule 106 uses a threshold value of "100" to evaluate the "transaction amount" evaluation criteria at node 302B. In the trained decision tree 300, however, a threshold value of "25" was determined for the "transaction amount" evaluation criteria at node 302B. Similarly, the existing rule 106 uses a threshold value of "10" to evaluate the "number of transactions per IP address" evaluation criteria at node 302D. In the trained decision tree 300, however, a threshold value of "5" was determined for this evaluation criteria at node 302D. As discussed above, rule-tuning module 112 may determine whether to suggest one or more of these changes to the threshold value based on the performance impact on the rule 106.

Figure 4:
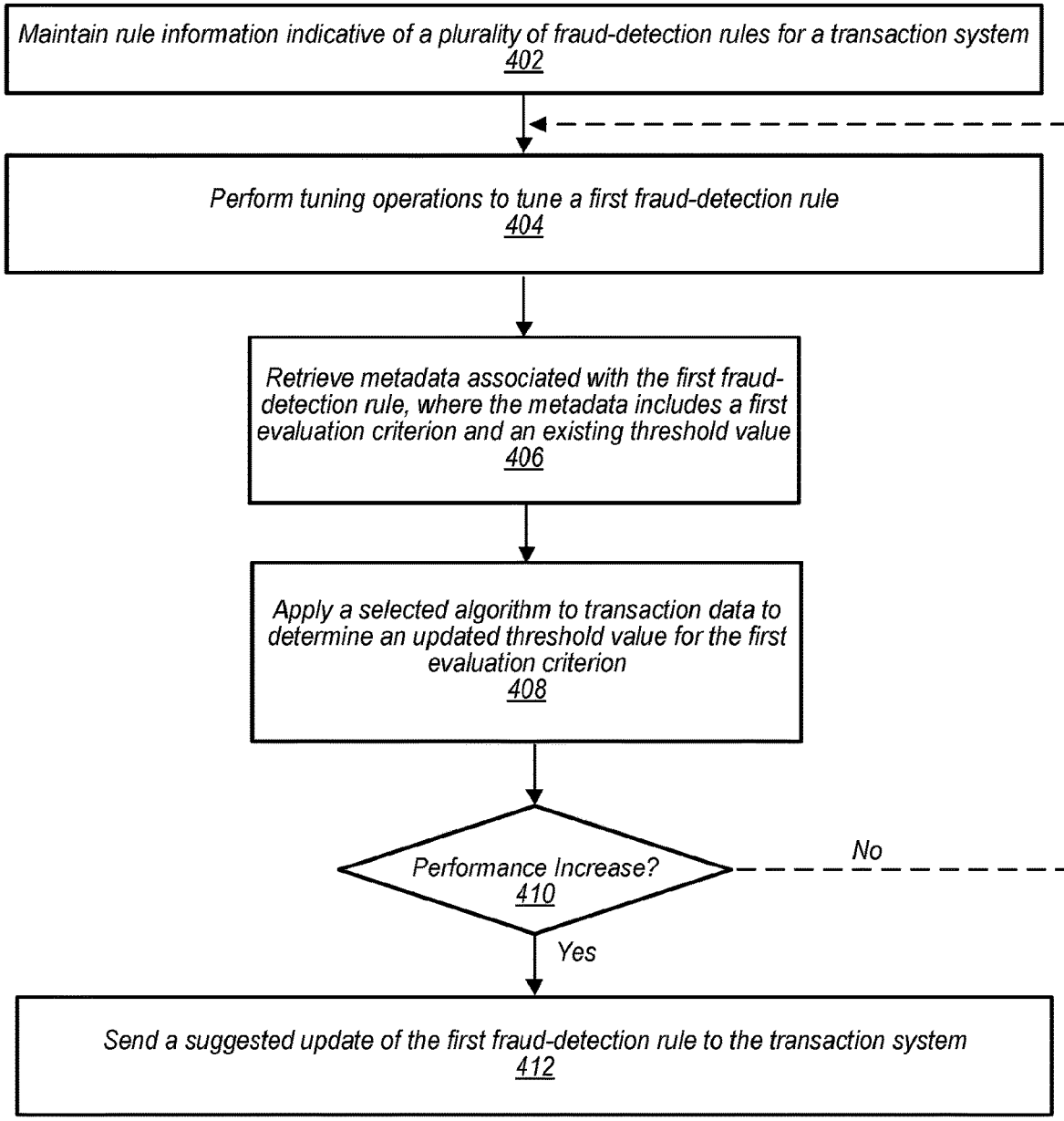
FIG. 4 is a flow diagram illustrating an example method for tuning a fraud-detection rule, according to some embodiments.

Turning now to FIG. 4, a flow diagram illustrating an example method 400 for tuning a fraud-detection rule is depicted, according to some embodiments. In various embodiments, method 400 may be performed by fraud-detection server 102 of FIG. 1 to tune a fraud-detection rule 106 used to implement a fraud-detection service for transaction system 120. For example, fraud detection server 102 may include (or have access to) a non-transitory, computer-readable medium having program instructions stored thereon that are executable by the fraud detection server to cause the operations described with reference to FIG. 4. In FIG. 4, method 400 includes elements 402-412. While these elements are shown in a particular order for ease of understanding, other orders may be used. In various embodiments, some of the method elements may be performed concurrently, in a different order than shown, or may be omitted. Additional method elements may also be performed as desired.

At 402, in the illustrated embodiment, the fraud detection server maintains rule information indicative of a plurality of fraud-detection rules for a transaction system. For example, as shown in FIG. 1, fraud detection server 102 includes (or have access to) rule information 104, which may store information corresponding to various fraud-detection rules used to implement a fraud-detection service for transaction system 120. In various embodiments, a given fraud-detection rule may specify a plurality of evaluation criteria used to evaluate a level of risk for transactions associated with the transaction system and, for each of the plurality of evaluation criteria, one or more corresponding threshold values. Note that, in some embodiments, fraud-detection server 102 may also provide a fraud-detection service for various other transaction systems (not shown in FIG. 1, for clarity).

At 404, in the illustrated embodiment, the fraud detection server 102 performs tuning operations to tune a first fraud-detection rule. As described above with reference to FIG. 2, tuning operations for a fraud-detection rule 106 may be initiated (e.g., by the tuning scheduler 202) for a variety of reasons. For example, in some embodiments, the rule-tuning module 112 may initiate the tuning operations in response to detecting a decrease in a performance of the rule 106 using the existing threshold value. In other embodiments, however, the tuning operations may be initiated in response to a user request from the transaction system 120. In various embodiments, the tuning operations include elements 406-408 and may be implemented, for example, by rule-tuning module 112. For example, at 406, the data preparation module 206 may retrieve metadata associated with the first fraud-detection rule, where the metadata includes a first evaluation criterion and an existing threshold value. In the embodiment of FIG. 2, for example, the metadata 220 may specify the evaluation criteria 108 and the threshold value(s) 110 for rule 106.

At 408, in the illustrated embodiment, the data analysis module 210 applies a selected algorithm 226 to transaction data to determine an updated threshold value 118 for the first evaluation criterion 108. In some embodiments, applying the selected algorithm may include generating a decision tree based on the transaction data, where the transaction data includes final fraud decisions for previous transactions associated with the transaction system. Further, in some embodiments, applying the selected algorithm may include traversing the decision tree, based on the first fraud-detection rule 106, to determine the updated threshold value 118 for the first evaluation criterion 108.

At 410, in the illustrated embodiment, the rule-tuning module 112 evaluates a performance of the first fraud-detection rule using the updated threshold value. For example, the performance evaluation module 212 may compare the performance of the rule 106 using the previous threshold values 110 against the performance of the rule 106 using the updated threshold values 118. As described above with reference to FIG. 2, if the performance of the updated version of the rule 106 exceeds a predetermined threshold (based, for example, on one or more performance metrics), method 400 proceeds to element 412 in which the fraud-detection server 102 sends a suggested update of the first fraud-detection rule 106 to the transaction system 120. As noted above, in some embodiments, the suggested update to the first fraud-detection rule 106 may include adjusting one or more threshold values for a given evaluation criteria. In some embodiments, the suggested update may include (instead of or in addition to the adjusted threshold values) one or more suggested adjustments to the evaluation criteria used by the rule 106. For example, in some such embodiments, the suggested update to the first fraud-detection rule may include a suggested second evaluation criteria and a corresponding second threshold value.

If, however, the performance does not increase (or does not increase above a certain threshold), method 400 may then return back to element 404 such that further tuning operations may be performed for the fraud-detection rule 106. In other embodiments, however, if the performance of the updated rule 106 does not improve upon the performance of the existing rule 106, the tuning operations may simply cease for the rule 106 (e.g., until a later time). In some embodiments, method 400 further includes the fraud-detection server 102 receiving, from the transaction system 120, an acceptance of the suggested update to the first fraud-detection rule 106. In such embodiments, fraud-detection server 102 may then update the rule information 104 for the first fraud-detection rule 106 to specify the updated threshold value 118 as the corresponding threshold value for the first evaluation criterion 108. Note that, in some embodiments, a given evaluation criteria may have two or more corresponding threshold values that are used to test the evaluation criteria. As one non-limiting example, an evaluation criteria that asks whether a transaction amount is greater than $25 but less than $100. In this example, the values "25" and "100" are the threshold values for the "transaction amount" evaluation criteria.

Further, in some embodiments, prior to receiving an acceptance of the suggested update to the first fraud-detection rule, the fraud-detection server 102 may receive a request from the transaction system 120 to test the suggested update. In such embodiments, the fraud-detection server 102 may apply the first fraud-detection rule, using the updated threshold value 118, to transaction data associated with the transaction system 120 over a predetermined time period (e.g., 14 days). Based on this application, the fraud-detection server 102 may determine test results for the first fraud-detection rule using the updated threshold value and may send test data back to the transaction system 120. In some such embodiments, the test data includes the test results for the first fraud-detection rule using the updated threshold value over the predetermined time interval and the actual performance results of the first fraud-detection rule using the existing threshold value over the same predetermined time interval. As noted above, some users may view a fraud-detection service that relies exclusively on machine learning models make fraud determinations as a "black box" that is difficult to interpret. In various embodiments, the disclosed systems and methods addresses this problem by allowing users to define fraud-detection rules while using machine learning techniques to refine these rules. Accordingly, in various embodiments, the disclosed techniques result in both a usable, transparent fraud-detection system and the performance increases offered by machine learning.

In various embodiments, fraud detection server 102 may provide a platform (e.g., a web-based software platform) through which various transaction systems may establish and monitor the fraud-detection rules used, by the fraud-detection server 102, to monitor for and detect fraudulent activity associated with their respective transaction systems. Referring now to FIGS. 5A-5D, user interfaces 500-530 respectively show example user interfaces ("UIs") that may be used (e.g., by an administrator associated with transaction system 120) to receive and accept a suggested rule update to a fraud-detection rule, according to some embodiments.

Figure 5A:
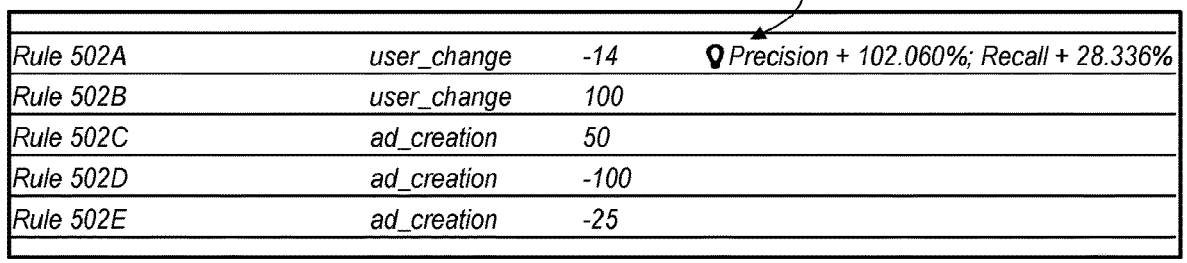

As part of this platform, in various embodiments, fraud detection server 102 may provide a rule list that specifies one or more fraud-detection rules 502 in use for a given transaction system. For example, in FIG. 5A, UI 500 shows a listing of five fraud-detection rules associated with transaction system 120 that may be used by fraud detection server 102 to implement a fraud detection service for the transaction system 120. In various embodiments, when the fraud detection server 102 sends a suggested update to a fraud-detection rule 502 to the transaction system 120 (as in element 412 of method 400), it may do so using a user interface similar to UI 500. For example, as shown in FIG. 5A, the rule list in UI 500 includes a suggested rule update 504 to fraud-detection rule 502A, as indicated in the far-right column of the rule list.

Figure 5B:
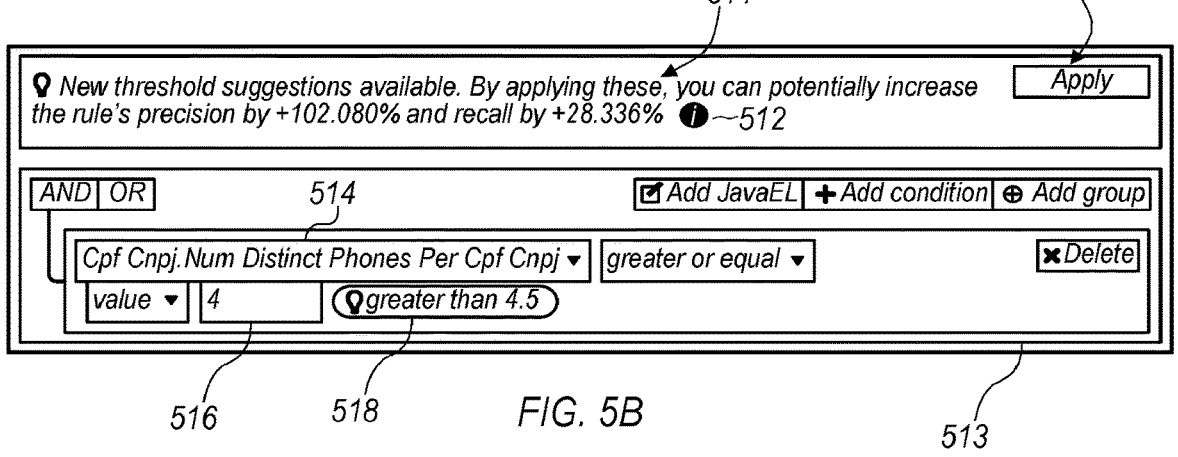

In various embodiments, if the user would like to view the suggested rule update 504 in more detail, the user may open a rule edit view (e.g., by clicking on rule 502A or the suggested rule update 504 or through any other suitable navigation technique), such as that shown in UI 510 of FIG. 5B. Using UI 510, the user may view additional details about the suggested rule update 504 and the potential impact of the suggested update 504 on the performance of fraud-detection rule 502A. For example, in FIG. 5B, UI 510 depicts a message 511 indicating the impact that accepting the suggested rule update 504 would have on the performance of rule 502A. In the depicted embodiment, acceptance of the suggested rule update 504 would increase the rule 502A's precision by 102.08% and its recall by 28.336%. Note, however, that this embodiment is shown merely as a non-limiting example. In other embodiments, any of various suitable performance metrics (or none) may be depicted by UI 510 in message 511. If the user would like to view additional details on the impact that the suggested rule update 504 would have on the performance of rule 502A, the user may, in various embodiments, select an information icon 512 (or use any other suitable navigation technique) and be presented with additional performance metrics information, such as that shown in UI 520 of FIG. 5C.

In FIG. 5C, UI 520 shows various performance metrics for the rule 502A, both before and after application of the suggested rule update 504. That is, UI 520 shows how the fraud-detection rule 502A actually performed over a given time period (the "before applying suggestions" column) and how it hypothetically would have performed over that same time period if the suggested updates 504 to rule 502A were in place (the "after applying suggestions" column), with reference to various performance metrics. Data for these performance metrics may be generated by the fraud detection server 102 and used to populate the table shown in FIG. 5C. In various embodiments, fraud detection server may generate the data for suggested rule update 504 (shown in FIG. 5C) using a "holdout" dataset associated with the transaction system 120 over a given time period. That is, fraud detection server 102 may generate the data shown in the "After applying suggestions" column using a dataset that was not used to train the selected algorithm that was, in turn, used to generate the suggested rule update 504. In the depicted embodiment, the listed performance metrics include precision, recall, f1 scores, f2 scores, and f.5 scores. Note, however, that these performance metrics are provided merely as an example and, in other embodiments, any suitable performance metric(s) may be used.

Returning now to FIG. 5B, UI 510 further includes a tool 513 that may be used to edit one or more aspects of a given fraud-detection rule. For example, UI 510 shows an evaluation criterion 514 associated with fraud-detection rule 502A. UI 510 further shows both an existing threshold value 516 for the evaluation criterion 514 and a suggested, updated threshold value 518 for the evaluation criterion 514. In the depicted embodiment, for example, the existing threshold value 516 is "4," while the suggested rule update 504 indicates that this threshold value should be "greater than 4.5" to improve the efficacy of rule 502A.

In various embodiments, if the user would like to apply the suggested rule update 504, he or she may do so via the UI 510 (for example using the "Apply" button 519 or any other suitable technique). Once the suggested rule update 504 is accepted by the user, the fraud detection server 102 may receive an indication of this acceptance and update the rule information 104 for the fraud-detection rule 502A to specify the updated threshold value 518 as the corresponding threshold value for evaluation criterion 514. After the user has accepted the suggested rule update 504, the user may be presented with UI 530 shown in FIG. 5D, in which the tool 513 has been updated to reflect the updated threshold value 518 for the evaluation criterion 514. Note that, in various embodiments, the user may also elect to revert back to one or more previous versions of the rule 502A, for example by selecting the "Revert" icon 532 shown in UI 530 of FIG. 5D. Further note that, in various embodiments, fraud detection server 102 may suggest multiple updates to one or more evaluation criteria for a given fraud-detection rule, which may be accepted or rejected by a user as shown with reference to FIGS. 5A-5D, as one non-limiting example. Additionally, in some embodiments, fraud detection server 102 may suggest an additional fraud-detection rule, instead of or in addition to suggesting an update to an existing fraud-detection rule.

Figure 6A:
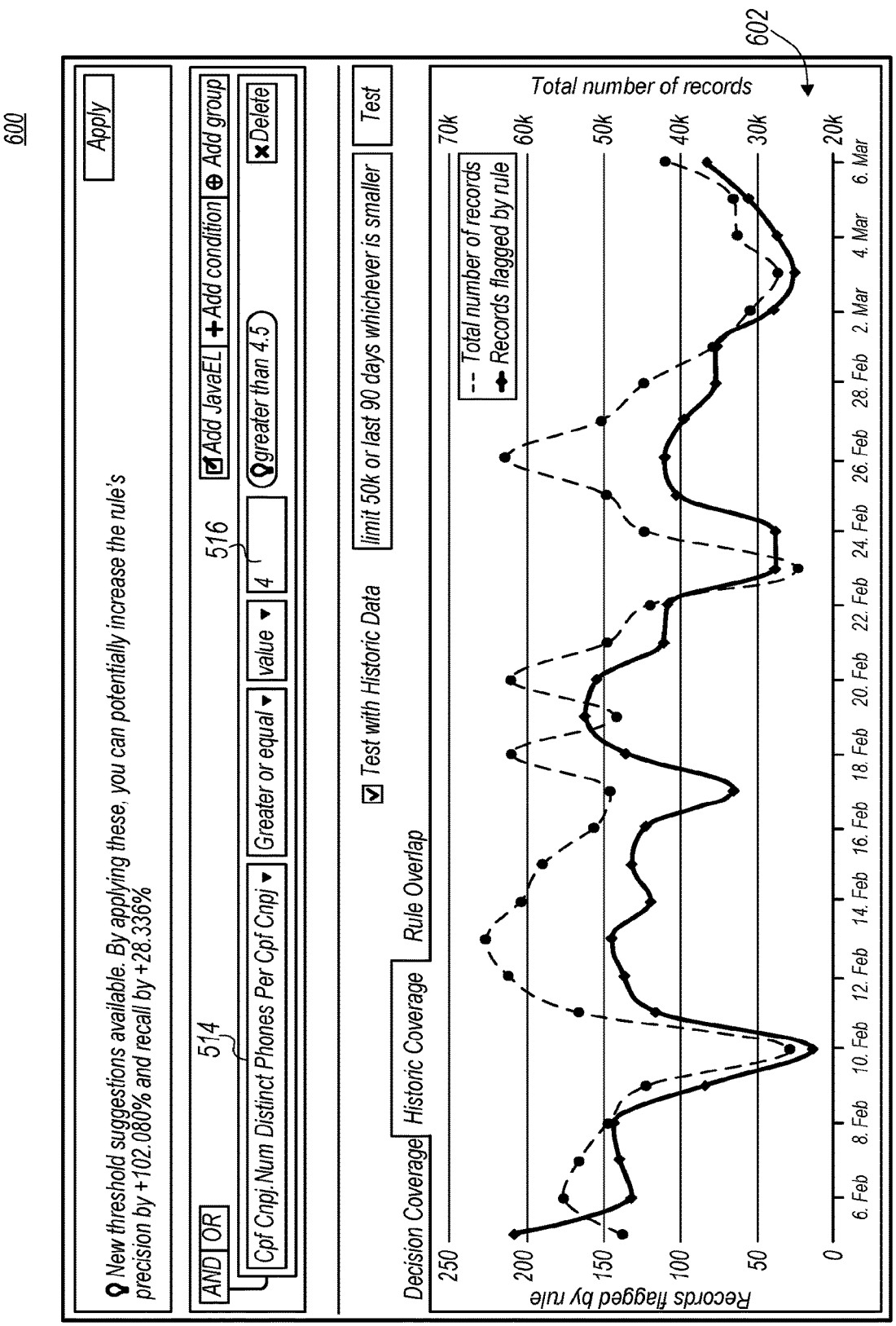
FIGS. 6A-6B are example user interfaces that may be used to present performance test data for a fraud-detection rule update, according to some embodiments.
Figure 6B:
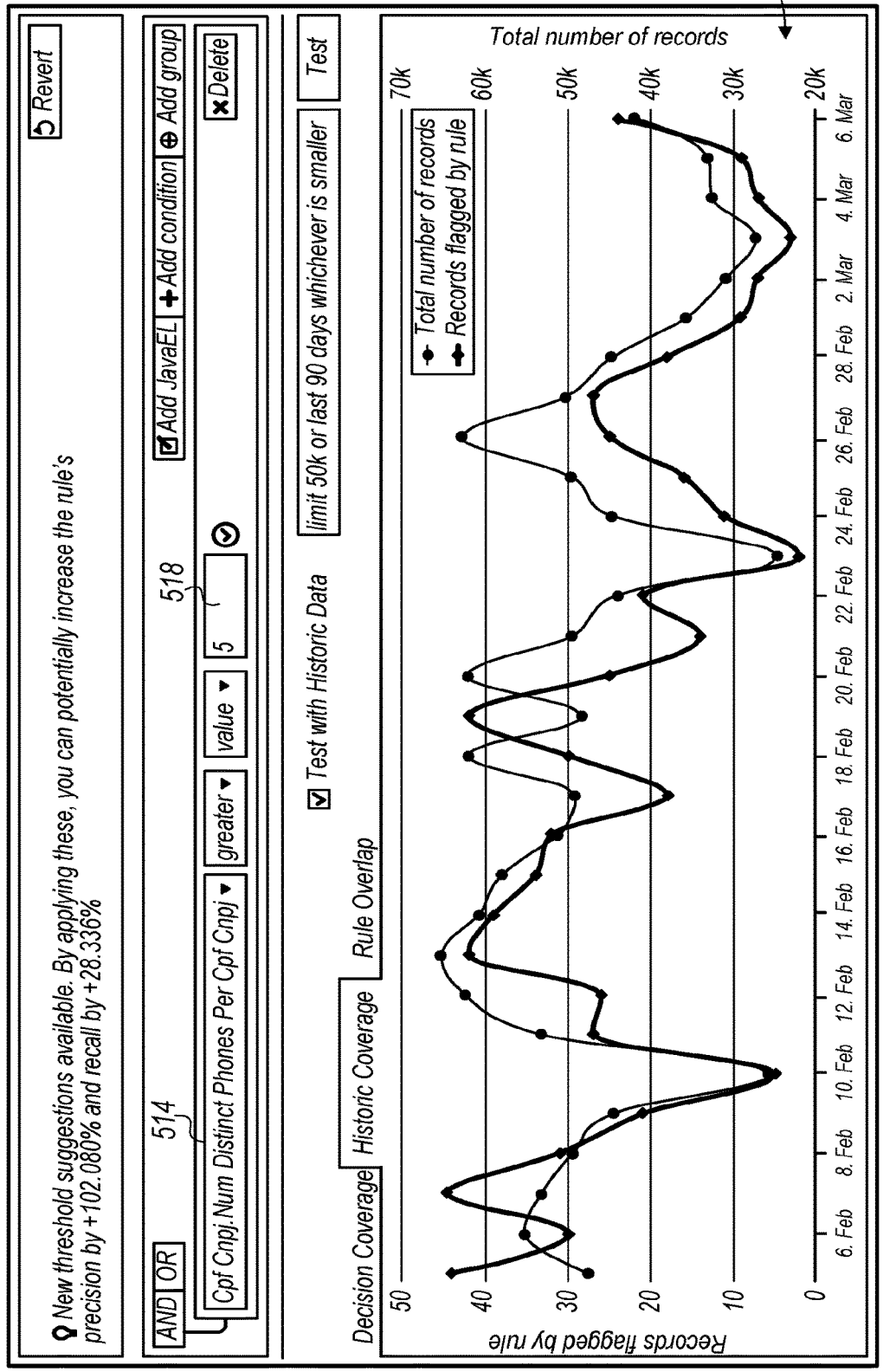

As noted above, in various embodiments, the platform provided by fraud detection server 102 may allow users associated with the transaction system 120 to test the performance impact of a suggested rule update 504 to a rule 502A, either before or after acceptance of the update 504. FIGS. 6A-6B respectively depict example UIs 600 and 610 used to present performance test data for a fraud-detection rule update to a user, according to some embodiments.

In FIG. 6A, UI 600 depicts a graph 602 showing the performance of the fraud-detection rule 502A using the existing threshold value 516 for the evaluation criterion 514 over a given time period (e.g., one month, in the depicted embodiment). For the given time period, graph 602 shows both the total number of records (e.g., the total number of transactions associated with transaction system 120) generated on a given day and the total number of records flagged by rule 502A. Note that, in graph 602 and graph 612 of FIG. 6B, the total number of records for a given day is indicated by the dashed line and the corresponding y-axis label on the right side of the graph, while the records flagged by rule 502A are indicated by the solid line and the corresponding y-axis label on the left side of the graph. So, for example, on February 13$^{th}$ on graph 602, there were approximately 65,000 total records generated that day (e.g., transactions performed with transaction system 120) and approximately 145 of those records were identified as satisfying rule 502A.

If the user would like to test the suggested rule update 504, the threshold value for the evaluation criterion 514 may be updated (e.g., manually by the user or automatically by the fraud detection server 102) and a new graph, showing the performance of the suggested rule update 504, may be presented. For example, in FIG. 6B, UI 610 depicts a graph 612 showing the performance of the fraud-detection rule 502A using updated threshold value 518 for evaluation criterion 514 over the same time period. In various embodiments, the suggested rule updates improve the performance of the fraud-detection rule involved by increasing its accuracy. For example, in the depicted embodiment, the suggested rule update 504 increases the precision and recall of the rule 502A. In various embodiments, an increase in the precision of a fraud-detection rule will result in fewer false-positives in which transactions that are not fraudulent are flagged by the fraud-detection rule. Further, in some embodiments, an increase in the recall of a fraud-detection rule will result in one or more records being flagged by the updated version of the fraud-detection rule that would have escaped detection by the previous version of the fraud-detection rule. In graph 612 of FIG. 6B, note that the total number of records flagged by the suggested rule update 504 has decreased significantly. For example, on February 13$^{th}$ on graph 612, there were approximately 65,000 total records generated and approximately 42 of those records were identified as satisfying the updated version of rule 502A (rule 502A using updated threshold value 518 for evaluation criterion 514). Thus, while the total number of records that were identified by the updated version of rule 502A decreased, the relevance of the identified records has increased, resulting in fewer false-positives and reducing the amount of manual review to be performed by users (e.g., analysts) associated with transaction system 120.

Thus, in various embodiments, the disclosed systems and methods allow transaction systems to instantly test suggested rule updates on large portions of historical data. This, in turn, can help eliminate the amount of time needed for manual rule testing, which can often span over days or weeks. Note that, although the suggested rule update 504 is being tested prior to acceptance by the user in the depicted embodiment, in other embodiments, the user may also test the performance impact of the suggested rule update after acceptance.

Example Computer System

Figure 7:
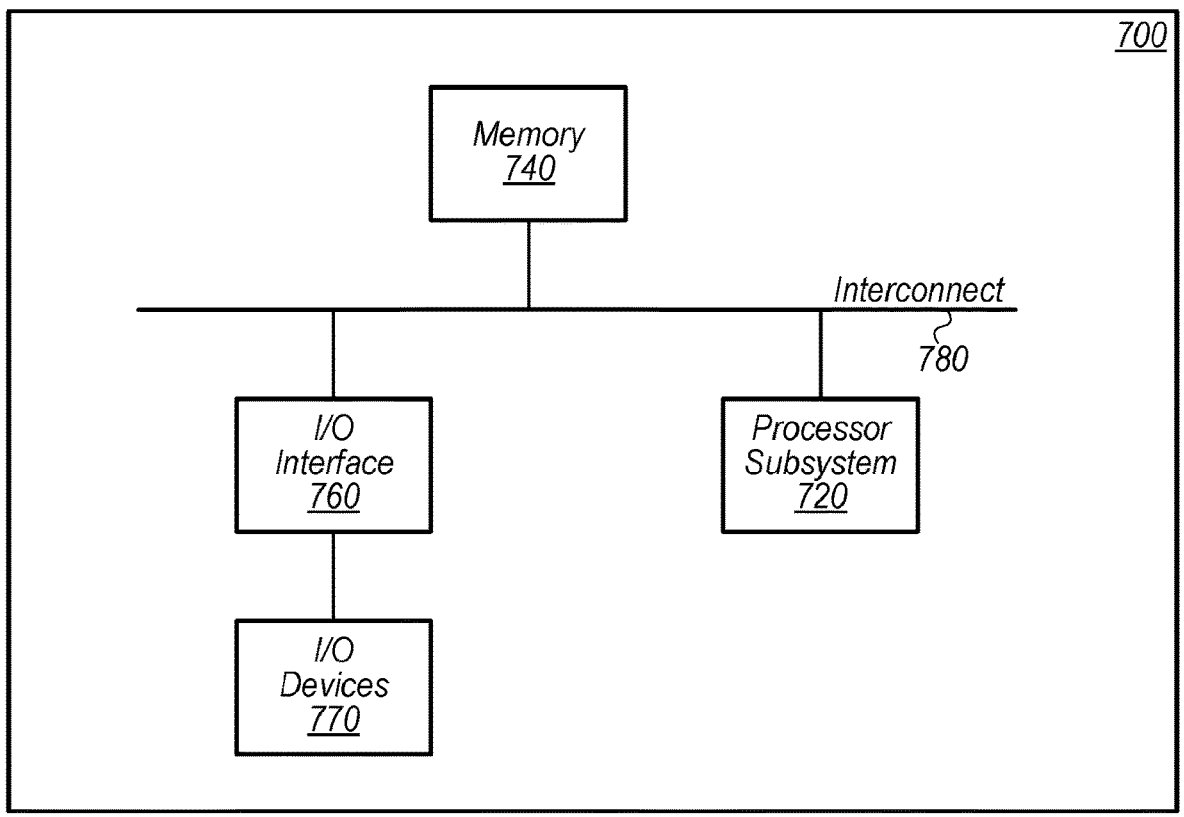
FIG. 7 is a block diagram illustrating an example computer system, according to some embodiments.

Referring now to FIG. 7, a block diagram of an example computer system 700 is depicted, which may implement one or more computer systems, such as fraud-detection server 102 of FIG. 1, according to various embodiments. Computer system 700 includes a processor subsystem 720 that is coupled to a system memory 740 and I/O interfaces(s) 760 via an interconnect 780 (e.g., a system bus). I/O interface(s) 760 is coupled to one or more I/O devices 770. Computer system 700 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 700 is shown in FIG. 7 for convenience, computer system 700 may also be implemented as two or more computer systems operating together.

Processor subsystem 720 may include one or more processors or processing units. In various embodiments of computer system 700, multiple instances of processor subsystem 720 may be coupled to interconnect 780. In various embodiments, processor subsystem 720 (or each processor unit within 720) may contain a cache or other form of on-board memory.

System memory 740 is usable to store program instructions executable by processor subsystem 720 to cause system 700 perform various operations described herein. System memory 740 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as system memory 740. Rather, computer system 700 may also include other forms of storage such as cache memory in processor subsystem 720 and secondary storage on I/O devices 770 (e.g., a hard drive, storage array, etc.). In some embodiments, these other forms of storage may also store program instructions executable by processor subsystem 720.

I/O interfaces 760 may be any of various types of interfaces configured to couple to and communicate with other devices, according to various embodiments. In one embodiment, I/O interface 760 is a bridge chip (e.g., Southbridge) from a front-side to one or more back-side buses. I/O interfaces 760 may be coupled to one or more I/O devices 770 via one or more corresponding buses or other interfaces. Examples of I/O devices 770 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 770 includes a network interface device (e.g., configured to communicate over WiFi, Bluetooth, Ethernet, etc.), and computer system 700 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units." "circuits," other components, etc.) may be described or claimed as "configured" to perform one or more tasks or operations. This formulation [entity] configured to [perform one or more tasks] is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "modules" operable to perform designated functions are shown in the figures and described in detail above (e.g., rule-tuning module 112, data analysis module 210, etc.). As used herein, the term "module" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority hereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
 a processor; and
 a memory having stored thereon instructions that are executable by the processor to cause the system to perform operations comprising:
 generating a graphical user interface (GUI) configured to display a proposed modification to a machine learning transaction classification rule, wherein the machine learning transaction classification rule is comprised of a plurality of data component values corresponding to a plurality of data factors;
 performing an analysis operation on the machine learning transaction classification rule, wherein the analysis operation comprises:
 accessing a first existing threshold value for a first data component value of the plurality of data component values, wherein values above the first existing threshold value for the first data component value indicate a first type of transaction classification, and wherein values below the first existing threshold value for the first data component value indicate a second different type of transaction classification;
 determining an updated threshold value for the first existing threshold value, wherein determining the updated threshold value comprises:
 accessing a machine learning transaction model that was created based on a training dataset that includes a plurality of labeled training examples corresponding to a plurality of previously conducted electronic transactions, wherein each of the plurality of labeled training examples are assigned a respective transaction classification from a plurality of transaction classifications, wherein the plurality of transaction classifications include the first type of transaction classification and the second type of transaction classification, and wherein the plurality of labeled training examples includes a first subset of transactions assigned to the first type of transaction classification and includes a second subset of transactions assigned to the second type of transaction classification;

determining, from the machine learning transaction model, that the updated threshold value provides a greater degree of accuracy in correctly classifying electronic transactions into one of at least the first type of transaction classification or the second type of transaction classification;

providing, to a user through the generated GUI, graphical indication information that includes an indication that the updated threshold value provides the greater degree of accuracy for the machine learning transaction classification rule;

receiving, from the user via the generated GUI, a selection indicating an acceptance of the updated threshold value; and replacing, in the machine learning transaction classification rule, the first existing threshold value for the first data component value of the plurality of data component values with the updated threshold value.

2. The system of claim 1, wherein the graphical indication information provided to the user includes a description of a particular data factor in the plurality of data factors that corresponds to the first existing threshold value and the updated threshold value.

3. The system of claim 1, wherein the graphical indication information provided to the user includes both the first existing threshold value and the updated threshold value.

4. The system of claim 1, wherein the machine learning transaction model comprises a decision tree model, and wherein the updated threshold value is associated with a particular node in the decision tree model.

5. The system of claim 1, wherein values equal to the first existing threshold value for the first data component value indicate the first type of transaction classification.

6. The system of claim 1, wherein values equal to the first existing threshold value for the first data component value indicate the second type of transaction classification.

7. A non-transitory computer-readable medium having stored thereon instructions that are executable by a system to cause the system to perform operations comprising:

causing display, on a user device of a user, of a graphical user interface (GUI) configured to display a proposed modification to a machine learning transaction classification rule, wherein the machine learning transaction classification rule is comprised of a plurality of data component values corresponding to a plurality of data factors;

performing an analysis operation on the machine learning transaction classification rule, wherein the analysis operation comprises:

accessing a first existing threshold value for a first data component value of the plurality of data component values, wherein values above the first existing threshold value for the first data component value indicate a first type of transaction classification, and wherein values below the first existing threshold value for the first data component value indicate a second different type of transaction classification;

determining an updated threshold value for the first existing threshold value, wherein determining the updated threshold value comprises:

accessing a machine learning transaction model that was created based on a training dataset that includes a plurality of labeled training examples corresponding to a plurality of previously conducted electronic transactions, wherein each of the plurality of labeled training examples are assigned a respective transaction classification from a plurality of transaction classifications, wherein the plurality of transaction classifications include the first type of transaction classification and the second type of transaction classification, and wherein the plurality of labeled training examples includes a first subset of transactions assigned to the first type of transaction classification and includes a second subset of transactions assigned to the second type of transaction classification;

determining, from the machine learning transaction model, that the updated threshold value provides a greater degree of accuracy in correctly classifying electronic transactions into one of at least the first type of transaction classification or the second type of transaction classification;

providing, to a user through the generated GUI, graphical indication information that includes an indication that the updated threshold value provides the greater degree of accuracy for the machine learning transaction classification rule;

receiving, from the user via the generated GUI, a selection indicating an acceptance of the updated threshold value; and replacing, in the machine learning transaction classification rule, the first existing threshold value for the first data component value of the plurality of data component values with the updated threshold value.

8. The non-transitory computer-readable medium of claim 7, wherein the operations further comprise: providing, in the GUI, a user-editable field allowing the user to modify the first existing threshold value to a user specified value.

9. The non-transitory computer-readable medium of claim 8, wherein the operations further comprise: receiving the user specified value and updating the machine learning transaction classification rule with the user specified value.

10. The non-transitory computer-readable medium of claim 8, wherein the indication that the updated threshold value provides the greater degree of accuracy includes at least one of an indication of precision or an indication of recall.

11. The non-transitory computer-readable medium of claim 7, wherein the graphical indication information provided to the user includes a description of a particular data factor in the plurality of data factors that corresponds to the first existing threshold value and the updated threshold value.

12. The non-transitory computer-readable medium of claim 7, wherein the graphical indication information provided to the user includes both the first existing threshold value and the updated threshold value.

13. The non-transitory computer-readable medium of claim 7, wherein the machine learning transaction model comprises a decision tree model, and wherein the updated threshold value is associated with a particular node in the decision tree model.

14. A method, comprising:

causing display, on a user device of a user, of a graphical user interface (GUI) configured to display a proposed modification to a machine learning transaction classification rule, wherein the machine learning transaction classification rule is comprised of a plurality of data component values corresponding to a plurality of data factors; performing, by a computer system, an analysis operation on the machine learning transaction classification rule, wherein the analysis operation comprises:

accessing a first existing threshold value for a first data component value of the plurality of data component values, wherein values above the first existing threshold value for the first data component value indicate a first type of transaction classification, and wherein values below the first existing threshold value for the first data component value indicate a second different type of transaction classification;

determining an updated threshold value for the first existing threshold value, wherein determining the updated threshold value comprises:

accessing a machine learning transaction model that was created based on a training dataset that includes a plurality of labeled training examples corresponding to a plurality of previously conducted electronic transactions, wherein each of the plurality of labeled training examples are assigned a respective transaction classification from a plurality of transaction classifications, wherein the plurality of transaction classifications include the first type of transaction classification and the second type of transaction classification, and wherein the plurality of labeled training examples includes a first subset of transactions assigned to the first type of transaction classification and includes a second subset of transactions assigned to the second type of transaction classification;

determining, from the machine learning transaction model, that the updated threshold value provides a greater degree of accuracy in correctly classifying electronic transactions into one of at least the first type of transaction classification or the second type of transaction classification;

providing, to a user through the generated GUI, graphical indication information that includes an indication that the updated threshold value provides the greater degree of accuracy for the machine learning transaction classification rule;

receiving, at the computer system via the generated GUI, a selection indicating an acceptance of the updated threshold value; and replacing, in the machine learning transaction classification rule, the first existing threshold value for the first data component value of the plurality of data component values with the updated threshold value.

15. The method of claim 14, wherein the first type of transaction classification comprises a legitimate transaction type.

16. The method of claim 14, wherein the second type of transaction classification comprises a fraudulent transaction type.

17. The method of claim 14, further comprising: providing, in the GUI, a user-editable field allowing the user to modify the first existing threshold value to a user specified value that may be different from both the first existing threshold value or the updated threshold value.

18. The method of claim 14, wherein the indication that the updated threshold value provides the greater degree of accuracy includes at least one of an indication of precision or an indication of recall.

19. The method of claim 14, further comprising: providing, in the GUI, a user selectable option to add an additional condition to the machine learning transaction classification rule, wherein the additional condition corresponds to a different data factor of the plurality of data factors than a data factor for the first threshold value.

20. The method of claim 14, wherein the graphical indication information provided to the user includes both the first existing threshold value and the updated threshold value.

* * * * *